United States Patent
Aoyama et al.

(10) Patent No.: US 9,334,933 B2
(45) Date of Patent: May 10, 2016

(54) CONTROL DEVICE AND CONTROL METHOD FOR CONTINUOUSLY VARIABLE TRANSMISSION

(71) Applicant: JATCO LTD, Fuji-shi, Shizuoka (JP)

(72) Inventors: Noritaka Aoyama, Okazaki (JP); Hideshi Wakayama, Hadano (JP); Naohiro Yamada, Atsugi (JP); Keichi Tatewaki, Atsugi (JP); Kousuke Waku, Hadano (JP)

(73) Assignee: JATCO LTD, Fuji-Shi (JP)

( * ) Notice: Subject to any disclaimer, the term of this patent is extended or adjusted under 35 U.S.C. 154(b) by 477 days.

(21) Appl. No.: 13/790,227

(22) Filed: Mar. 8, 2013

(65) Prior Publication Data

US 2013/0260960 A1 Oct. 3, 2013

(30) Foreign Application Priority Data

Mar. 28, 2012 (JP) .................................. 2012-75023

(51) Int. Cl.
| | |
|---|---|
| *F16H 9/16* | (2006.01) |
| *B60W 10/06* | (2006.01) |
| *B60W 30/18* | (2012.01) |
| *F16H 61/662* | (2006.01) |
| *B60W 10/02* | (2006.01) |
| *B60W 10/107* | (2012.01) |
| *B60W 30/184* | (2012.01) |

(52) U.S. Cl.
CPC ................. *F16H 9/16* (2013.01); *B60W 10/02* (2013.01); *B60W 10/06* (2013.01); *B60W 10/107* (2013.01); *B60W 30/1846* (2013.01); *B60W 30/18072* (2013.01); *F16H 61/66272* (2013.01); *B60W 2510/105* (2013.01); *B60W 2510/1075* (2013.01); *B60W 2710/023* (2013.01); *B60W 2710/027* (2013.01); *B60Y 2300/46* (2013.01); *B60Y 2300/71* (2013.01); *Y10T 477/624* (2015.01)

(58) Field of Classification Search
CPC ................ F16H 61/66272; F16H 9/16; B60W 30/18072; B60W 30/1846; B60W 2710/027; B60W 2710/023; B60W 2510/1075; B60W 2510/105; Y10T 477/6203; Y10T 477/624; Y10T 477/78
See application file for complete search history.

(56) References Cited

U.S. PATENT DOCUMENTS

| | | | |
|---|---|---|---|
| 8,696,515 B2 | 4/2014 | Yamada et al. | |
| 2001/0027143 A1 | 10/2001 | Nakano et al. | |
| 2007/0184936 A1 | 8/2007 | Nakayama | |
| 2011/0312469 A1* | 12/2011 | Honda | ............................ 477/39 |
| 2012/0053012 A1 | 3/2012 | Yamada et al. | |

FOREIGN PATENT DOCUMENTS

| | | |
|---|---|---|
| EP | 2 426 384 A1 | 3/2012 |
| JP | 2000-193081 A | 7/2000 |
| JP | 2010-276083 A | 12/2010 |
| JP | 2011-007236 A | 1/2011 |
| JP | 2012-051468 A | 3/2012 |

* cited by examiner

*Primary Examiner* — Huan Le
(74) *Attorney, Agent, or Firm* — Foley & Lardner LLP

(57) ABSTRACT

A control device for continuously variable transmission is composed of a continuously variable transmission mechanism and friction engagement elements, and includes a control unit for decreasing, during a coast stop control to stop a driving power source in a traveling state of a vehicle, a transmission torque capacity transmittable by the friction engagement elements to fall under a belt capacity being torque transmittable by a belt using a holding force of pulleys.

10 Claims, 10 Drawing Sheets

CONTROL DEVICE AND CONTROL METHOD FOR CONTINUOUSLY VARIABLE TRANSMISSION

TECHNICAL FIELD OF THE INVENTION

The present invention relates to a shift control device for continuously variable transmission in which a belt is prevented from slipping.

BACKGROUND OF THE INVENTION

Oil pressure generated in a mechanical oil pump driven by the engine is supplied to a v-belt continuously variable transmission. Pulley pressures (including a primary pulley pressure and a secondary pulley pressure) generated by using the oil pressure as a source pressure are supplied to a primary pulley and a secondary pulley. These pulley pressures are used to hold a belt and these pulley pressures are controlled to change a groove width in each of the pulleys in order to realize a shift.

In vehicles on which such a continuously variable transmission is mounted, a so-called coast stop control has been carried out to stop the engine not only when a vehicle is standing still but also before a vehicle comes to a halt for the purpose of improving fuel performance.

However, in the coast stop control, driving a mechanical oil pump is discontinued in accordance with suspension of the engine and it becomes difficult to ensure a sufficient pulley pressure for use in holding a belt with the likelihood of causing a belt to slip.

As a measure taken against such belt slippage, JP2011-007326A describes a technique for shifting a speed ratio of a continuously variable transmission to a predetermined slippage suppressing speed ratio before suspension of the engine.

SUMMARY OF THE INVENTION

According to JP2011-007326A, before suspension of the engine in a low speed ratio in which a primary pulley has a small winding diameter, a speed ratio of a continuously variable transmission is upshifted to, for example, the vicinity of a speed ratio of 1 so that the primary pulley has a large belt winding diameter.

However, when the engine comes to a halt by a coast stop control, an oil pump is prevented from operating and an oil pressure decreases due to the control, wherein it is difficult to control a speed ratio.

For example, it is possible to make an upshift from a speed ratio with a small winding diameter of a primary pulley by increasing a primary pulley pressure but it is difficult to increase an oil pressure when the engine stops and a force to hold a belt is likely to decrease. An upshift from a speed ratio with a small winding diameter of a primary pulley can be realized by discharging a secondary pulley pressure but excessive discharge of an oil pressure results in reduction of an oil pressure more than necessary and a force to hold a belt is likely decrease. Therefore, even in an attempt to shift a speed ratio to a slippage suppressing speed ratio, there is a fear of causing belt to slip due to reduction of a force to hold a belt during a cost stop control.

The present invention was achieved in view of such a problem and aims at providing a controller for continuously variable transmission in which belt slippage can be prevented even in suspension of the engine in such an occasion as a coast stop control.

According to one embodiment of the present invention, a control device for continuously variable transmission is mounted on a vehicle and applied by having a continuously variable transmission mechanism for changing a speed ratio by changing a winding diameter of a belt held by an oil pressure supplied to pulleys and friction engagement elements connected to the continuously variable transmission in order to allow transmission of a driving force of a driving power source to driving wheels continuously. The control device is characterized by having a control unit which reduces, during a coast stop control to stop the driving power source in a traveling state of the vehicle, a transmission torque capacity transmittable by the friction engagement elements to fall under a belt capacity which corresponds to torque transmittable by the belt using a holding force of the pulleys.

The details as well as other features and advantages of this invention are set forth in the remainder of the specification and are shown in the accompanying drawings.

DESCRIPTION OF THE PREFERRED EMBODIMENTS

Figure 1:
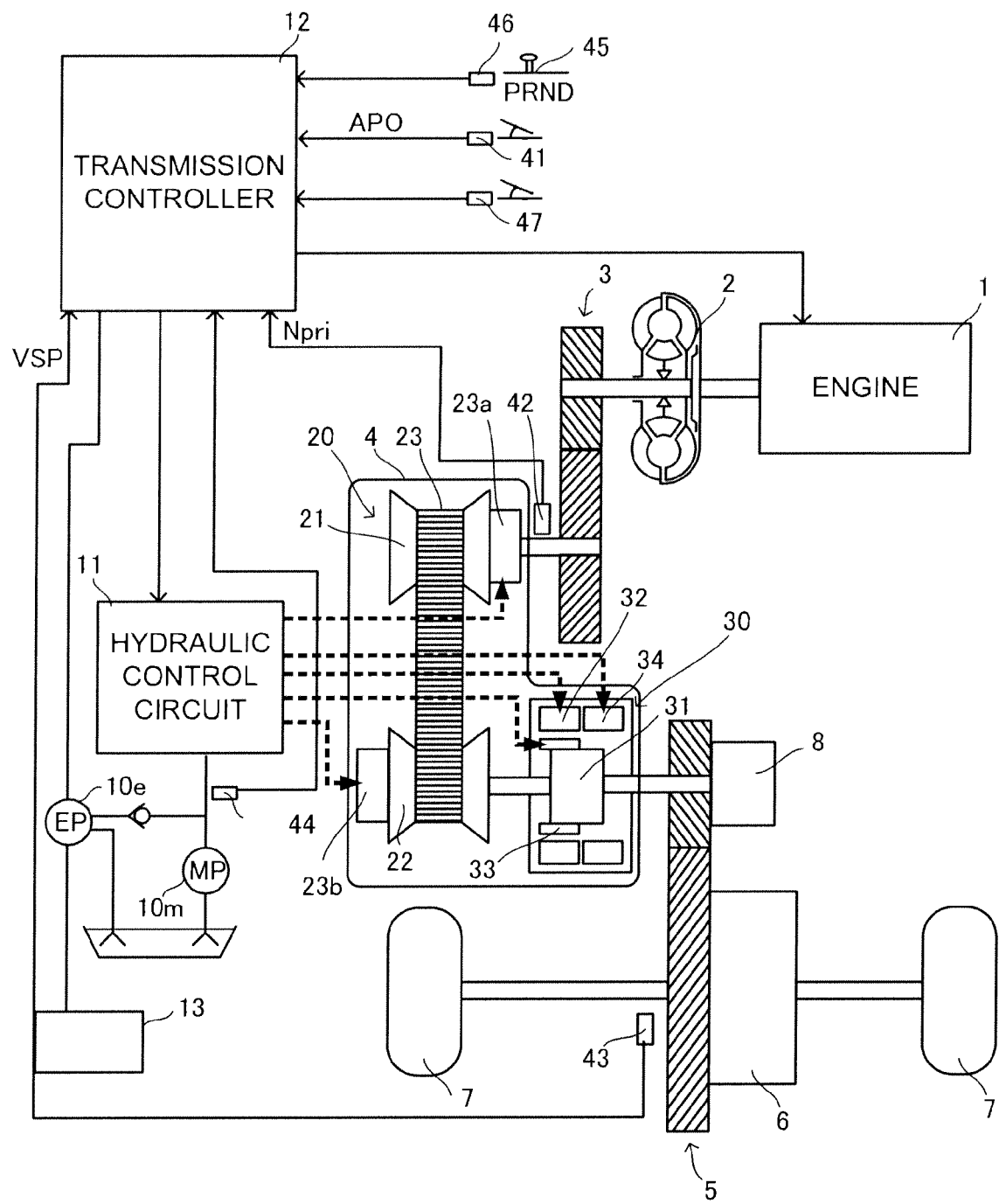
FIG. 1 is a schematic configuration diagram of a vehicle equipped with a control device for a continuously variable transmission according to a first embodiment of the present invention is mounted.

FIG. 1 is a schematic configuration diagram of a vehicle equipped with a control device for a continuously variable transmission according to a first embodiment of the present invention is mounted. Rotation outputted by the engine 1 is transmitted to driving wheels 7 via a torque converter 2 having a lock-up clutch, a first gear train 3, a continuously variable transmission (simply referred to as a "transmission 4" hereinafter), a second gear train 5 and a final reduction gear 6. The second gear train 5 is provided with a parking mechanism 8 for mechanically locking an output shaft of the transmission 4 to be non-rotatable in parking.

The vehicle is also provided with a mechanical oil pump 10*m* which receives rotation of the engine 1 and is driven by using a part of power of the engine 1, and an electric oil pump 10*e* driven in response to power supplied from a battery 13. The transmission 4 is also provided with a hydraulic control circuit 11 for regulating an oil pressure supplied from at least one of the mechanical oil pump 10*m* and the electric oil pump 10e in order to supply to each part of the transmission 4, and a controller 12 for controlling the hydraulic control circuit 11 and the engine 1.

Each component will be explained as follows. The transmission 4 is provided with a continuously variable transmission mechanism (referred to as a "variator 20" hereinafter), and an auxiliary transmission mechanism 30 arranged in series to the variator 20. The expression "arranged in series" means serial arrangement of the variator 20 and the auxiliary transmission mechanism 30 on the same power transmission path. The auxiliary transmission mechanism 30 may be directly connected to an output shaft of the variator 20 as shown in this example or may also be connected thereto via another shift or power transmitting mechanism (e.g. gear train).

The variator 20 is a belt-type continuously variable transmission mechanism, including a primary pulley 21, a secondary pulley 22 and a V belt 23 which is wound around these pulleys 21 and 22. Each of the pulleys 21 and 22 has a fixed conical plate, movable conical plates arranged by making sheave surfaces to oppose the fixed conical plate so as to form V grooves in a space created with the fixed conical plate, and a hydraulic cylinder 23a or 23b arranged on a rear surface of the movable conical plate to allow displacement of the movable conical plates in the shaft direction. By adjusting an oil pressure supplied to the hydraulic cylinders 23a and 23b, the width of the V grooves is varied to change a contact radius between the V belt 23 and each of the pulleys 21 and 22, whereby allowing a continuous change of a speed ratio vRatio of the variator 20.

The auxiliary transmission mechanism 30 is a transmission mechanism to realize two forward stages and one reverse stage. The auxiliary transmission mechanism 30 is provided with a Ravigneaux-type planetary gear mechanism 31 in which two planetary gear carriers are connected to each other, and a plurality of friction engagement elements (i.e. a Low brake 32, a High clutch 33 and a Rev brake 34) that are connected to a plurality of rotating elements to constitute the Ravigneaux-type planetary gear mechanism 31 and change a linkage of these rotating elements. By adjusting an oil pressure supplied to each of the friction engagement elements 32 to 34 and making a change in the engaged/released state of each of the friction engagement elements 32 to 34, a shift stage is changed in the auxiliary transmission mechanism 30. For example, by fastening the Low brake 32 and releasing the High clutch 33 and the Rev brake 34, the shift stage of the auxiliary transmission mechanism 30 is brought into a first speed. By fastening the High clutch 33 and releasing the Low brake 32 and the Rev brake 34, the shift stage of the auxiliary transmission mechanism 30 is brought into a second speed whose speed ratio is less than that of the first speed. By fastening the Rev brake 34 and releasing the Low brake 32 and the High clutch 33, the shift stage of the auxiliary transmission mechanism 30 is reversed.

Figure 2:
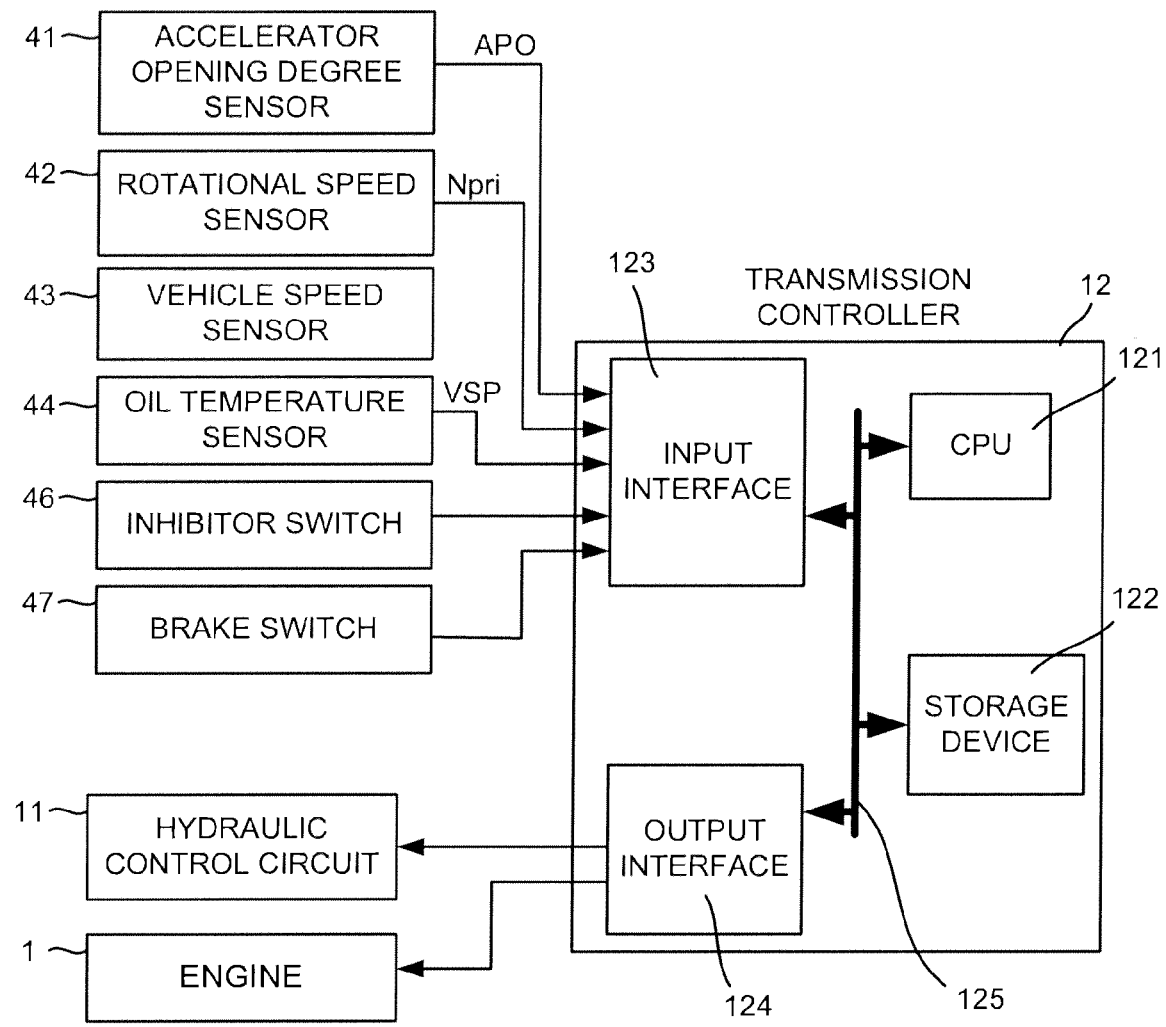
FIG. 2 is an explanatory diagram showing an example of a structure of a transmission control device according to the first embodiment of the present invention.

As shown in FIG. 2, the transmission controller 12 is composed of a CPU 121, a storage device 122 made of RAM/ROM, an input interface 123, an output interface 124 and a bus 125 by which these components are connected to each other.

The input interface 123 receives a signal outputted from an accelerator opening degree sensor 41 for detecting the degree of opening of an accelerator pedal (referred to as an "accelerator opening degree APO" hereinafter), a signal outputted from a rotational speed sensor 42 for detecting a rotational speed inputted to the transmission 4 (which is equal to a rotational speed of the primary pulley 21 and referred to as a "primary rotational speed Npri" hereinafter), a signal outputted from a vehicle speed sensor 43 for detecting a running speed of the vehicle (referred to as a "vehicle speed VSP" hereinafter), a signal outputted from an oil temperature sensor 44 for detecting an oil temperature of the transmission 4, and a signal outputted from an inhibitor switch 46 for detecting the position of a select lever, or other signals.

The storage device 122 stores a shift control program for the transmission 4 and a shift map used in the shift control program. The CPU 121 reads and executes the shift control program stored in the storage device 122, generates shift control signals by applying various kinds of arithmetic processes to various kinds of signals inputted via the input interface 123, and outputs generated shift control signals to the hydraulic control circuit 11 via the output interface 124. Various kinds of values used by the CPU 121 in arithmetic processes and arithmetic results obtained therefrom are appropriately stored in the storage device 122.

The hydraulic control circuit 11 is composed of a plurality of flow paths and a plurality of hydraulic control valves. Based on a shift control signal sent from the transmission controller 12, the hydraulic control circuit 11 switches paths to supply an oil pressure by controlling the plurality of the hydraulic control valves, and prepares a required oil pressure from an oil pressure generated in the oil pump 10 in order to supply to each unit of the transmission 4. Therefore, the speed ratio vRatio of the variator 20 and the shift stage of the auxiliary transmission mechanism 30 are varied to shift the transmission 4.

Figure 3:
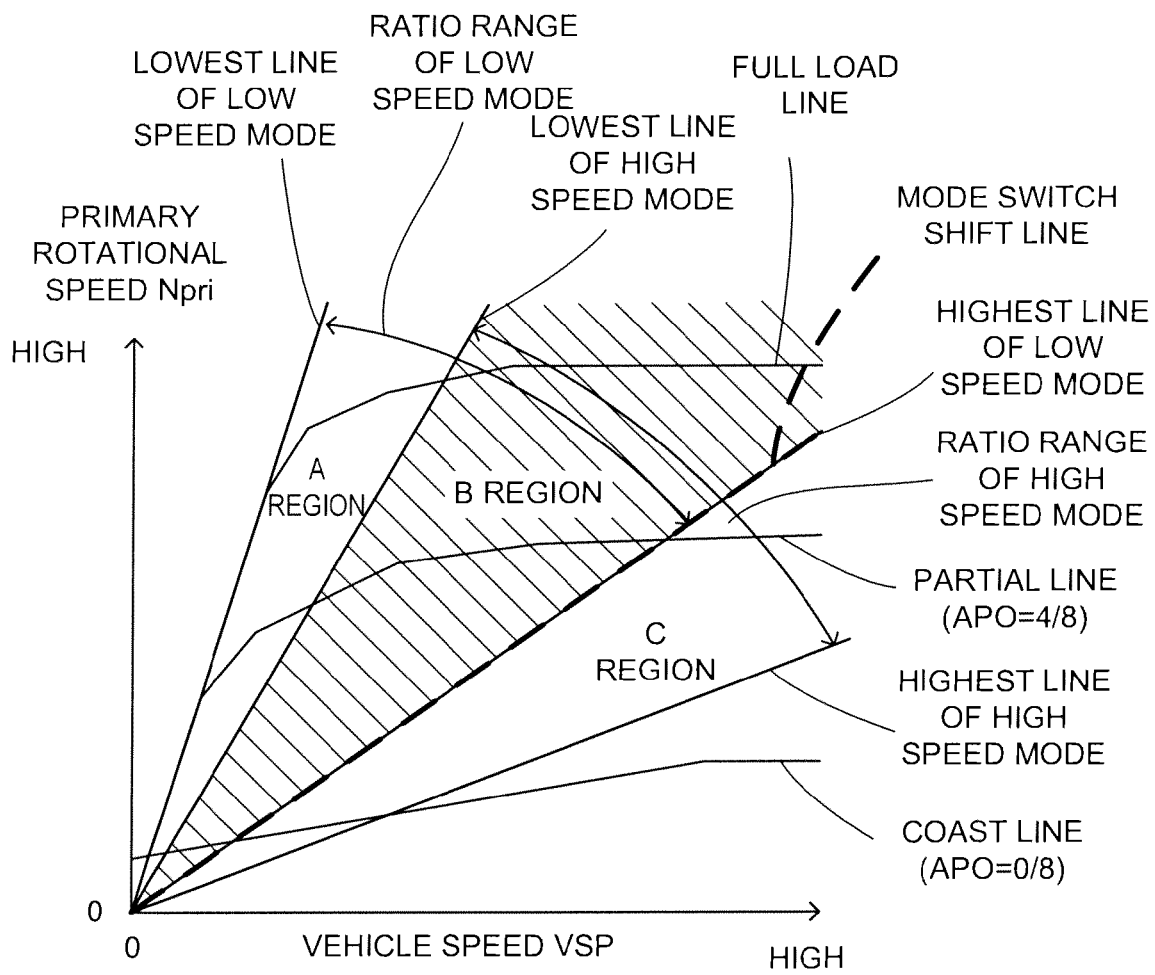
FIG. 3 is an explanatory diagram showing an example of a shift map according to the first embodiment of the present invention.

FIG. 3 shows an example of the shift map stored in the storage device 122 of the transmission controller 12.

On the shift map, an operating point of the transmission 4 is determined based on the vehicle speed VSP and the primary rotational speed Npri. The inclination made by a line to connect an operating point of the transmission 4 and zero point at the bottom left corner of the shift map expresses a speed ratio of the transmission 4 (i.e. an entire speed ratio obtained by multiplying a speed ratio subRatio of the auxiliary transmission mechanism 30 to the speed ratio vRatio of the variator 20, referred to as a "through speed ratio Ratio" hereinafter). The shift map includes, similar to the shift map of the conventional belt-type continuously variable transmission, a shift line set for each value of the accelerator opening degree APO and the transmission 4 is shifted according to a shift line which is selected in proportion to the accelerator opening degree APO. For simplification, FIG. 3 includes only a full load line (i.e. shift line obtained when the accelerator opening degree APO falls in 8/8), a partial line (i.e. shift line obtained when the accelerator opening degree APO falls in 4/8) and a coast line (i.e. shift line obtained when the accelerator opening degree APO falls in 0).

When the transmission 4 operates in a low speed mode, the transmission 4 can be shifted in a range between the lowest line of the low speed mode, which is obtained by setting the speed ratio vRatio of the variator 20 to a maximum degree, and the highest line of the low speed mode, which is obtained by setting the speed ratio vRatio of the variator 20 to a minimum degree. At this time, the transmission 4 has an operating point which moves within A region and B region. In contrast, when the transmission 4 operates in a high speed mode, the transmission 4 can be shifted in a range between the lowest line of the high speed mode, which is obtained by setting the speed ratio vRatio of the variator 20 to a maximum degree, and the highest line of the high speed mode, which is obtained by setting the speed ratio vRatio of the variator 20 to a minimum degree. At this time, the transmission 4 has an operating point which moves within B region and C region.

A speed ratio in each shift stage of the auxiliary transmission mechanism 30 is set so that a speed ratio corresponding to the highest line of the low speed mode (i.e. highest speed ratio in the low speed mode) is less than a speed ratio corresponding to the lowest line of the high speed mode (i.e. lowest speed ratio in the high speed mode). Therefore, a low speed mode ratio range which is a range allowed for the through speed ratio Ratio of the transmission 4 to occupy in the low speed mode is partially overlapped by a high speed mode ratio range which is a range allowed for the through speed ratio Ratio of the transmission 4 to occupy in the high speed mode and when an operating point of the transmission 4 falls in the B region which is interposed between the lowest line of the high speed mode and the highest line of the low speed mode, the transmission 4 is allowed to select either the low speed mode or the high speed mode.

The transmission controller 12 refers to the shift map to set the through speed ratio Ratio corresponding to the vehicle speed VSP and the accelerator opening degree APO (i.e. driving state of the vehicle) as an achieving through speed ratio DRatio. The achieving through speed ratio DRatio is a target value to be finally achieved by the through speed ratio Ratio in the driving state. Then, the transmission controller 12 sets a target through speed ratio tRatio which is a transient target value for use in allowing the through speed ratio Ratio to follow the achieving through speed ratio DRatio corresponding to desired response characteristics, and controls the variator 20 and the auxiliary transmission mechanism 30 so that the through speed ratio Ratio coincides with the target through speed ratio tRatio.

A mode switch shift line for use in shifting the auxiliary transmission mechanism 30 (i.e. shift line 1-2 of the auxiliary transmission mechanism 30) is set to overlap highest line of the low speed mode on the shift map. A through speed ratio corresponding to the mode switch shift line (referred to as a "mode switch speed ratio mRatio" hereinafter) is equal to the highest speed ratio in the low speed mode.

Then, when an operating point of the transmission 4 crosses the mode switch shift line or when the through speed ratio Ratio of the transmission 4 is varied across the mode switch speed ratio mRatio, the transmission controller 12 carries out a mode switch shift control. In the mode switch shift control, the transmission controller 12 shifts the auxiliary transmission mechanism 30 and carries out a coordinated shift to change the speed ratio vRatio of the variator 20 to a direction opposite to a direction to which the speed ratio subRatio of the auxiliary transmission mechanism 30 is varied.

In the coordinated shift, when the through speed ratio Ratio of the transmission 4 is brought into a state of being less than the mode switch speed ratio mRatio from a state of being larger than that, the transmission controller 12 changes the shift stage of the auxiliary transmission mechanism 30 from the first speed to the second speed (referred to as a "1-2 shift" hereinafter) and changes the speed ratio vRatio of the variator 20 to become a larger speed ratio. In contrast, when the through speed ratio Ratio of the transmission 4 is brought into a state of being larger than the mode switch speed ratio mRatio from a state of being less than that, the transmission controller 12 changes the shift stage of the auxiliary transmission mechanism 30 from the second speed to the first speed (referred to as a "2-1 shift" hereinafter) and changes the speed ratio vRatio of the variator 20 to become a smaller variation ratio.

The reason why the coordinated shift is carried out in the mode switch shifting is to suppress a sense of incompatibility felt by a driver resulting from a change of inputted rotation caused by a stage difference of the through speed ratio Ratio of the transmission 4. The reason why the mode switch shifting is carried out when the speed ratio vRatio of the variator 20 falls in the highest speed ratio is because torque inputted to the auxiliary transmission mechanism 30 is at the minimum in this state under torque inputted to the variator 20 at this time and shifting the auxiliary transmission mechanism 30 in this state makes it possible to alleviate a shift shock of the auxiliary transmission mechanism 30.

According to the shift map, when the vehicle is parked, the speed ratio vRatio of the variator 20 is brought into the lowest speed ratio and the shift stage of the auxiliary transmission mechanism 30 is set to the first speed.

The controller 12 of the present embodiment executes a coast stop control to suspend rotation of the engine 1 while the vehicle is traveling, in addition to an idle stop control to suspend rotation of the engine 1 while the vehicle is standing still, in order to suppress fuel consumption.

The coast stop control is a control to suppress fuel consumption by automatically suspending the engine 1 while the vehicle is traveling in a low vehicle speed range. The coast stop control is common to a fuel cut control, which is executed when an accelerator is turned off, in terms of suspending fuel supply but there is a difference in terms of that, as opposed to the usual fuel cut control which is executed when the vehicle is traveling at relatively high speed and accompanied by engagement of the lock-up clutch of the torque converter 2 in order to ensure an engine brake, the coast stop control is executed when the vehicle is traveling at relatively low speed immediately before coming to a halt and stops rotation of the engine 1 by releasing the lock-up clutch.

In execution of the coast stop control, the controller 12 initially determines whether or not, for example, the following conditions a) to d) are met:

a) Accelerator pedal is detached from the foot (accelerator opening degree APO=0);
b) Brake pedal is stepped on (the brake switch 47 is turned on);
c) Vehicle speed is equal to or less than predetermined low vehicle speed (e.g. 15 km/h); and
d) Lock-up clutch is released.

These conditions can also be paraphrased as conditions to judge a driver intends to stop the vehicle.

When the coast stop conditions are met, the controller 12 stops rotation of the engine 1 by suspending fuel supply to the engine 1.

Next, a coast stop control for the vehicle which is thus configured will be explained.

As stated above, the controller 12 stops rotation of the engine 1 by suspending fuel supply to the engine 1 when the coast stop conditions are met. At this time, the mechanical oil pump 10m for generating an oil pressure by a driving force of the engine 1 gradually stops to discontinue supply of an oil pressure from the mechanical oil pump 10m to the hydraulic control circuit 11.

Oil pressure is required even in suspending the engine 1 in order to maintain a force to hold the belt by each of the pulleys in the variator 20 and fasten the friction engagement elements of the auxiliary transmission mechanism 30. Therefore, when the engine 1 is subjected to a coast stop, the controller 12 allows supply of an oil pressure to the hydraulic control circuit 11 by driving the electric oil pump 10e.

Figure 4:
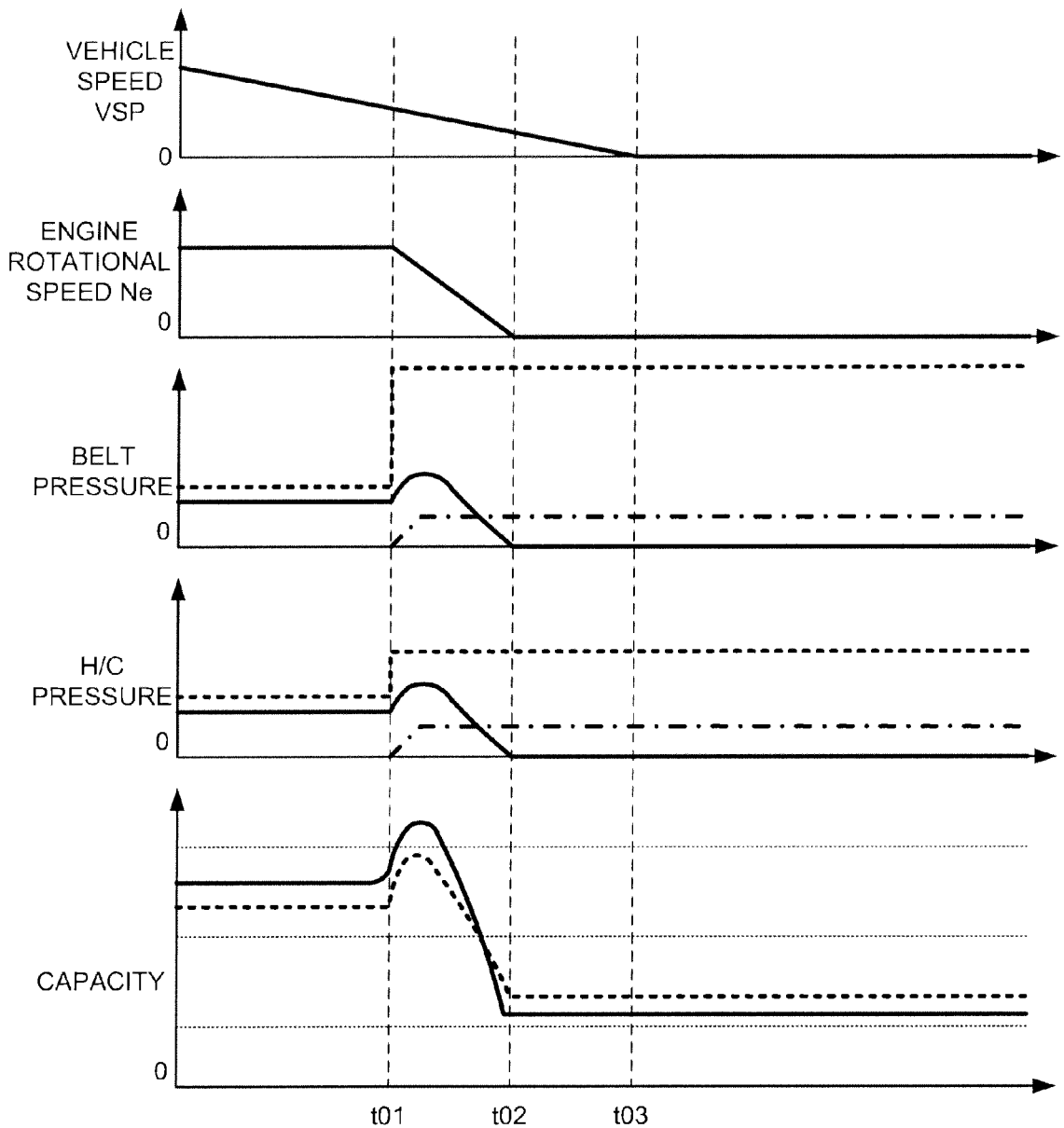
FIG. 4 is an explanatory diagram of a coast stop control according to a comparative example of the present invention.

FIG. 4 is an explanatory diagram of a conventional coast stop control applied to the transmission, showing a comparative example in the present embodiment.

FIG. 4 shows, from the top, a vehicle speed VSP, an engine rotational speed Ne, an oil pressure for the secondary pulley of the variator 20 to hold the belt 23 (referred to as a "belt pressure" hereinafter), an oil pressure for the high clutch 33 serving as the friction engagement element (referred to as a "H/C pressure" hereinafter), the magnitude of torque transmittable by the variator 20 via the belt 23 held by a holding force of each of the pulleys using a belt pressure in the variator 20 (referred to as a "belt capacity" hereinafter), and the magnitude of torque transmittable by the auxiliary transmission mechanism using a fastening force provided by an H/C pressure in the high clutch 33 serving as the friction engagement element (referred to as a "H/C capacity" hereinafter).

Here, a belt pressure and a belt capacity of the belt 23 in the secondary pulley 22 will be explained as an example. In the graph of the belt pressure shown in FIG. 4, a broken line refers to an indicated value of an oil pressure, a solid line refers to an actual oil pressure supplied by the mechanical oil pump 10$m$, and a one-dot chain line refers to an actual oil pressure supplied by the electric oil pump 10$e$. In the graph of the H/C pressure, a broken line refers to an indicated value of an oil pressure, a solid line refers to an actual oil pressure supplied by the mechanical oil pump 10$m$, and a one-dot chain line refers to an actual oil pressure supplied by the electric oil pump 10$e$. In the graph of the capacity, a broken line refers to a belt capacity of the belt 23 and a solid line refers to an H/C capacity of the high clutch 33.

Since a speed ratio in a coast stop is in the vicinity of the lowest value and an oil pressure of the primary pulley 21 is determined according to the secondary pulley 22, only the secondary pulley 22 will be explained here. The friction engagement elements will be explained by using a fastened state of the high clutch 33, which is fastened in a coast stop and transmits power, as an example.

In FIG. 4, when the vehicle decelerates gradually and the coast stop conditions are met (at timing t01), the controller 12 makes a coast stop for the engine 1. Therefore, the engine rotational speed Ne decreases gradually and the engine 1 stops at timing t02. In accordance with a decrease of the engine rotational speed Ne, an oil pressure generated in the mechanical oil pump 10$m$ also decreases.

At the same time as making a coast stop for the engine 1, the controller 12 starts driving the electric oil pump 10$e$. At this time, the controller 12 sets a larger value (e.g. indicated value of maximum oil pressure) for an indicated pressure applied to the variator 20 and an indicated pressure applied to the friction engagement elements than a value used at and before the start of the coast stop. This is because an oil pressure generated in the electric oil pump 10$e$ is less than that of the mechanical oil pump 10$m$ and in order to make best use of an oil pressure of the electric oil pump 10$e$ by setting a large indicated pressure.

Therefore, while the mechanical oil pump 10$m$ is driven in a period from the timing t01 to the timing t02, the belt capacity and the H/C capacity are transiently made larger.

Thereafter, the vehicle comes to a halt and the vehicle speed VSP falls in 0 (at timing t03).

When an oil pressure is supplied by the mechanical oil pump 10$m$ before the engine 1 is subjected to a coast stop, a belt capacity of the variator 20 is less than an H/C capacity of the friction engagement element.

A capacity to fasten the friction engagement elements is generated by bringing the friction members into contact with each other. Therefore, an H/C capacity of the friction engagement element is larger than a belt capacity exhibited by a force to hold the belt in the variator 20 in which the metallic belt and the pulleys are brought into contact with each other by oil. Accordingly, an H/C capacity exceeds a belt capacity at and before the timing t01.

In contrast, in a state with a reduced oil pressure due to suspension of the mechanical oil pump 10, an H/C capacity of the friction engagement element decreases in accordance with the oil pressure and the H/C capacity further decreases in a low oil pressure range due to a return spring. Meanwhile, the variator 20 is configured so as not to reduce a belt capacity in order to prevent slippage of the belt, and therefore, a belt capacity decreases gently relative to reduction of an oil pressure.

In such a circumstance, particularly when a belt capacity is less than an H/C capacity at transient timings between t01 and t02, an input of large torque to the transmission 4 poses a threat of causing the belt 23 to slip earlier than the high clutch 33.

For example, when a driving force decreases after the start of making a coast stop for the engine 1, there is a case in which large torque is inputted to the transmission 4 due to a sudden change of deceleration resulting from further stepping on a brake. A road surface change (such as riding on a bump) may also result in large torque inputted to the transmission 4. If a belt capacity is less than an H/C capacity in such a large torque input with the torque in excess of the belt capacity, there is a possibility of causing the belt 23 to slip earlier than the high clutch 33.

Therefore, according to the present embodiment, the following control is made to prevent the belt from slipping.

Figure 5:
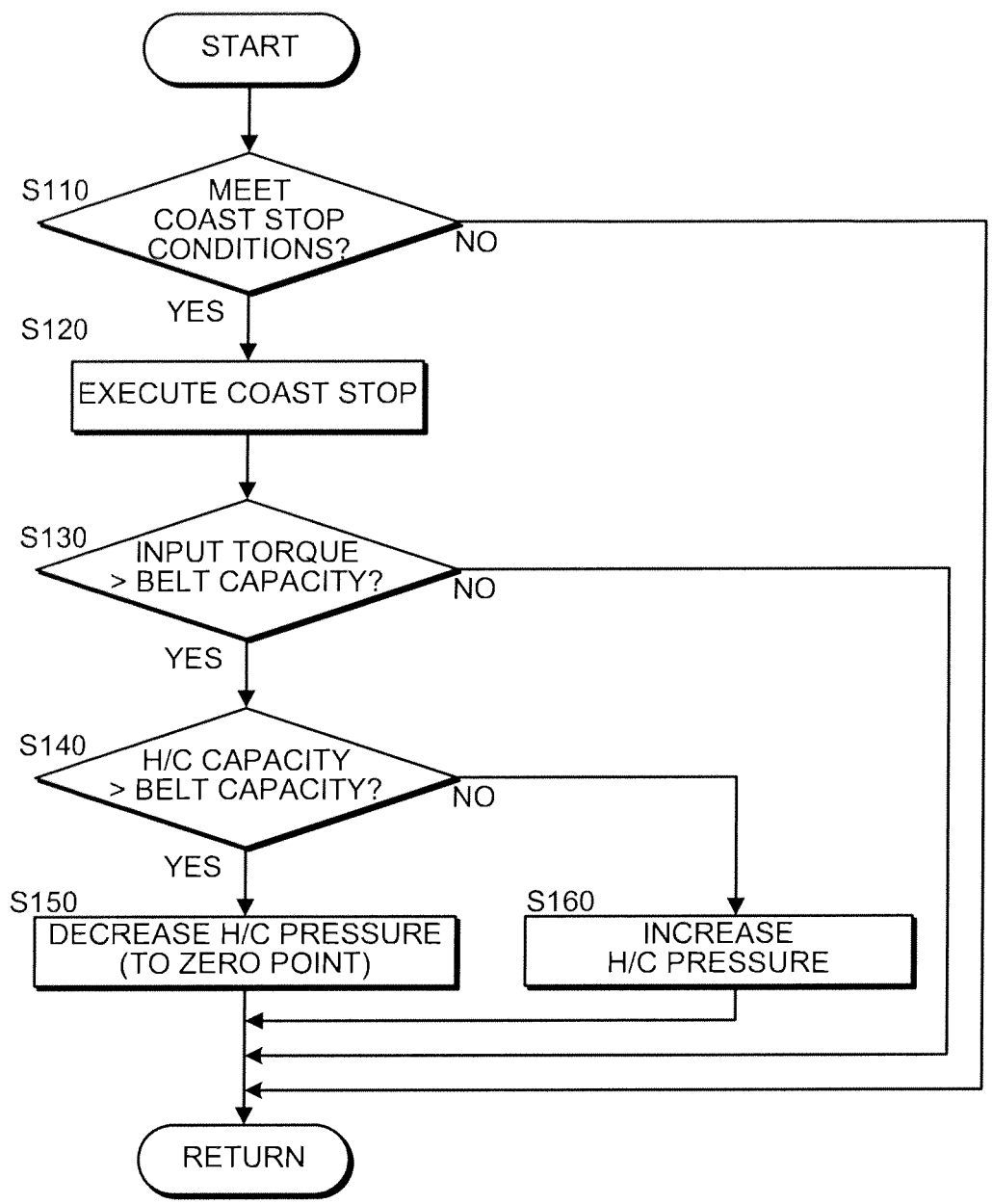
FIG. 5 is a flowchart of a coast stop control according to the first embodiment of the present invention.

FIG. 5 is a flowchart to execute a coast stop control by the controller 12 according to the present embodiment.

When the engine 1 starts (e.g. when the ignition is turned on), the controller 12 starts execution of the flowchart shown in FIG. 5 and execution is realized according to a predetermined period (e.g. 10 ms).

Firstly, the controller 12 determines whether or not the aforementioned coast stop conditions are met (S110). When the coast stop conditions are not met, the controller 12 returns to other processes without making a subsequent control.

When it is determined that the coast stop conditions are met, the process moves onto step S120 in which the controller 12 makes a control to stop the engine 1 and bring it into a coast stop state by controlling the amount of fuel injection and a throttle valve or other factors of the engine 1. At this time, the lockup clutch of the torque converter 2 is released simultaneously so as to provide a converter state in which the engine 1 and the transmission 4 are separated from each other in torque transmission.

Next, the process moves onto step S130 in which the controller 12 determines if torque is inputted to the transmission 4 and the magnitude of the torque is detected as exceeding a belt capacity, or whether or not the magnitude of the input torque is detected or predicted as exceeding a belt capacity.

Detecting the magnitude of input torque as exceeding a belt capacity is realized in that, for example, input torque is determined as possibly exceeding a belt torque when a brake pedal stepping rate ΔBRKp detected by the brake sensor 47 is larger than a predetermined stepping rate or when a brake hydraulic pressure change rate ΔBRKf detected by the brake sensor 47 is larger than a predetermined change rate.

The controller 12 may also be provided with an acceleration sensor to similarly detect input torque as exceeding a belt capacity when acceleration falls in a predetermined value or more.

When a car navigation system is mounted on the vehicle and a road surface on which the vehicle is currently traveling is determined as a bad road from map information and GPS positioning information of the car navigation system, it may be similarly determined as YES in the step S130 by predicting that input torque can exceed a belt capacity.

When it is determined by a camera mounted on the vehicle that the vehicle suddenly approached a vehicle in front thereof in terms of the inter-vehicle distance or the traffic light turned red, determination as YES may be similarly made in the step S130 by predicting input torque can exceed a belt capacity.

When input torque is detected or predicted as exceeding a belt capacity, the process moves onto step S140. Otherwise, the controller 12 returns to other processes without making a subsequent control.

In the step S140, the controller 12 determines whether or not a capacity of the friction engagement elements in the auxiliary transmission mechanism 30 (i.e. H/C capacity here) exceeds a belt capacity. When an H/C capacity is determined as exceeding a belt capacity, the process moves onto step S150. Otherwise, the process moves onto step S160. A belt capacity and an H/C capacity may be obtained by arranging a hydraulic sensor in the hydraulic control circuit 11 and measuring actual pressures or may also be calculated based on indicated values outputted from the controller 12 to the hydraulic control circuit 11.

In the step S150, the controller 12 causes reduction of an H/C pressure. More specifically, the controller 12 sets an indicated pressure applied to the high clutch 33 to zero point (i.e. indicated oil pressure to render a gap between an input element and an output element of the high clutch zero as well as render an H/C capacity zero). Therefore, a control is made to cause reduction of an H/C pressure so as to decrease an H/C capacity to fall under a belt capacity.

In the step S160, an H/C pressure which was controlled to fall in zero point is increased by the controller 12 to exceed zero point so as to be a predetermined indicated pressure. More specifically, an indicated pressure applied to the high clutch 33 is set as a predetermined indicated pressure based on a current vehicle state (such as vehicle speed VSP) so that an H/C capacity becomes a predetermined torque capacity. A predetermined torque capacity is set in a range in which an H/C capacity falls under a belt capacity.

Figure 6:
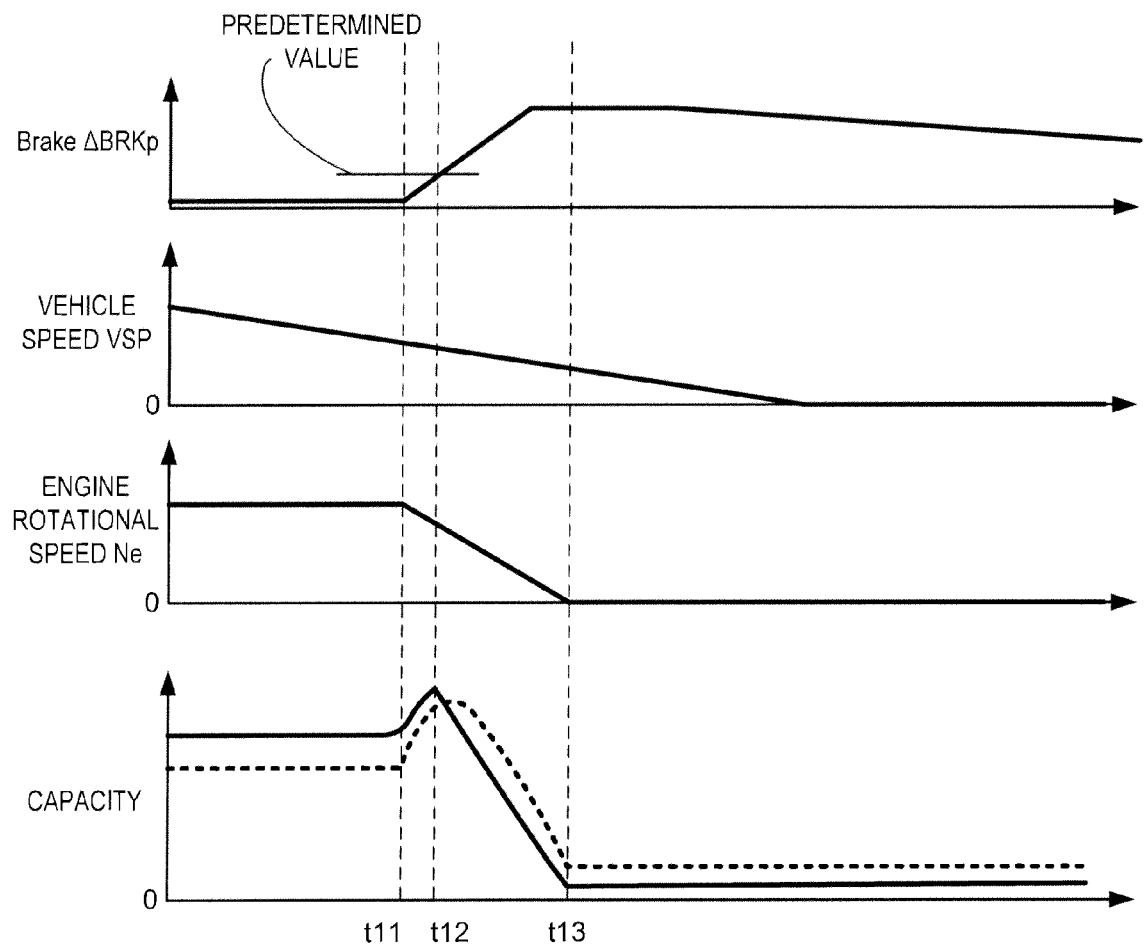
FIG. 6 is an explanatory diagram of the coast stop control according to the first embodiment of the present invention.

To be more specific, when a control is made to bring the engine 1 into a coast stop state in the step S120, the engine 1 does not stop immediately but stops eventually through a gradual decrease of a rotational speed (at timings t11 to t13 in FIG. 6). Accordingly, during this period, the mechanical oil pump 10m is driven and an oil pressure is supplied to the hydraulic control circuit 11. The oil passage itself also has a residual pressure in the hydraulic control circuit 11. By supplying an oil pressure to an H/C pressure, an H/C pressure can be increased in an early stage of the coast stop control.

By such a control, when input torque exceeds a belt capacity and the belt 23 is likely to slip, a capacity of the friction engagement elements in the auxiliary transmission mechanism (e.g. H/C capacity) is controlled to decreases so that an H/C capacity falls under a belt capacity. Therefore, the high clutch 33 is made to slip earlier than the belt 23 in response to input torque and the belt 23 is prevented from slipping.

In the step S150, instead of setting an H/C pressure to zero point, an H/C pressure may be calculated and controlled so that an H/C capacity is brought into a range of falling under a belt capacity.

FIG. 6 is an explanatory diagram of a coast stop control according to the present embodiment.

FIG. 6 shows, from the top, the brake pedal stepping rate ΔBRKp, the vehicle speed VSP, the engine rotational speed Ne and the relationship between a belt capacity and an H/C capacity.

In the graph showing the relationship between a belt capacity, an H/C capacity and input torque, a solid line refers to an H/C capacity of the high clutch 33 and a broken line refers to a belt capacity of the belt 23.

In FIG. 6, the coast stop conditions are met at timing t11 (YES in step S110 shown in FIG. 5) and execution of a coast stop starts (step S120 shown in FIG. 5).

Then, when it is determined that input torque exceeds a belt capacity at timing t12, determination is made in the step S140 shown in FIG. 5. Here, when an H/C capacity is determined as exceeding a belt capacity, an H/C pressure is set to zero point in the step S150 shown in FIG. 5.

By such a control, an H/C capacity decreases gradually from the timing t12 and a belt capacity exceeds an H/C capacity. Thereafter, the H/C capacity falls in zero point at timing t13. The aforementioned steps S140 to S160 shown in FIG. 5 are processed in a period from the timing t12 to the timing t13, wherein a control is made by increasing an H/C capacity to exceed zero point using an oil pressure of the mechanical oil pump 10m and a residual pressure of the hydraulic control circuit 11 as stated above so that the H/C capacity falls in a range without exceeding a belt capacity. At this time, the H/C capacity is preferably controlled to slightly fall under a belt capacity.

Therefore, even if torque inputted to the transmission 4 increases at and after the timing t12, owing to a belt capacity in excess of an H/C capacity, the high clutch 33 is made to slip earlier due to input torque and slippage of the belt 23 is suppressed.

As stated above, the first embodiment of the present invention is applied to the transmission 4 mounted on a vehicle and having the continuously variable transmission mechanism (i.e. variator) 20 capable of changing a speed ratio by changing a winding diameter of the belt 23 held by an oil pressure supplied to the pulleys (i.e. the primary pulley 21 and the secondary pulley), and the friction engagement elements (i.e. the low brake 32, the high clutch 33 and the rev brake 34) connected to the variator 20 in order to allow transmission of a driving force of the engine 1 serving as a driving power source to the driving wheels 7 continuously.

The controller 12 makes a coast stop control to stop the engine 1 during traveling and decreases, in making a coast stop control, an H/C capacity transmittable by the friction engagement elements to fall under a belt capacity. For example, an H/C capacity is controlled to be zero point.

By making such a control, a belt capacity is controlled to exceed an H/C capacity and therefore, the high clutch 33 is made to slip earlier due to input torque so as to prevent slippage of the belt 23.

The controller 12 decreases an H/C capacity when input torque is detected or predicted, wherein an H/C capacity is decreased only when input torque is detected and an H/C capacity is not decreased in other cases, so that a fastening shock occurring at restart due to a decrease of a fastening force of the friction engagement elements and a start lag due to transmission of the friction engagement elements at restart can be suppressed.

In decreasing a transmission torque capacity, the controller 12 decreases a transmission torque capacity by turning the friction engagement elements to be unable to transmit torque (i.e. zero point).

In general, when an H/C capacity of the high clutch 33 in the auxiliary transmission mechanism 30 is decreased while the vehicle is traveling with the engine 1 being driven, there is a possibility of failing to transmit a driving force of the engine and therefore it is not possible to reduce an H/C capacity during traveling. Meanwhile, as shown in the present embodiment, a state under a coast stop control is a state in which the vehicle is about to stop, wherein it is unnecessary to transmit torque to the engine 1, so that an H/C capacity can be reduced to zero point. Accordingly, by decreasing an H/C capacity to zero point, the high clutch 33 is made to slip earlier due to input torque and the belt 23 is prevented from slipping.

The controller 12 makes an H/C capacity smaller than a belt capacity when torque inputted to the continuously variable mechanism 4 is larger than a belt capacity, whereby causing the high clutch 33 to slip earlier due to input torque and preventing the belt 23 from slipping, while maintaining a fastening force of the friction engagement elements.

The controller 12 makes a control in response to detection of torque inputted to the continuously variable transmission 4 so that an H/C capacity is made smaller than a belt capacity or preferably an H/C capacity becomes slightly less than a belt capacity, whereby allowing a control to maintain a fastening force of the high clutch 33 as much as possible and a control to cause the high clutch 33 to slip earlier in response to input torque.

The controller 12 increases an H/C capacity to exceed zero point without decreasing it in the case of no detection or prediction of input torque, whereby a fastening shock occurring at restart due to reduction of a fastening force of the friction engagement elements and a start lag due to transmission of the friction engagement elements at restart can be suppressed while maintaining a fastening force of the friction engagement elements.

The controller 12 increases an H/C capacity to exceed zero point without decreasing it in the case of no detection or prediction of input torque, whereby a fastening shock occurring at restart due to reduction of a fastening force of the friction engagement elements and a start lag due to transmission of the friction engagement elements at restart can be suppressed while maintaining a fastening force of the friction engagement elements. This aspect corresponds to the effect of claim 8.

Next, a second embodiment of the present invention will be explained.

Figure 7:
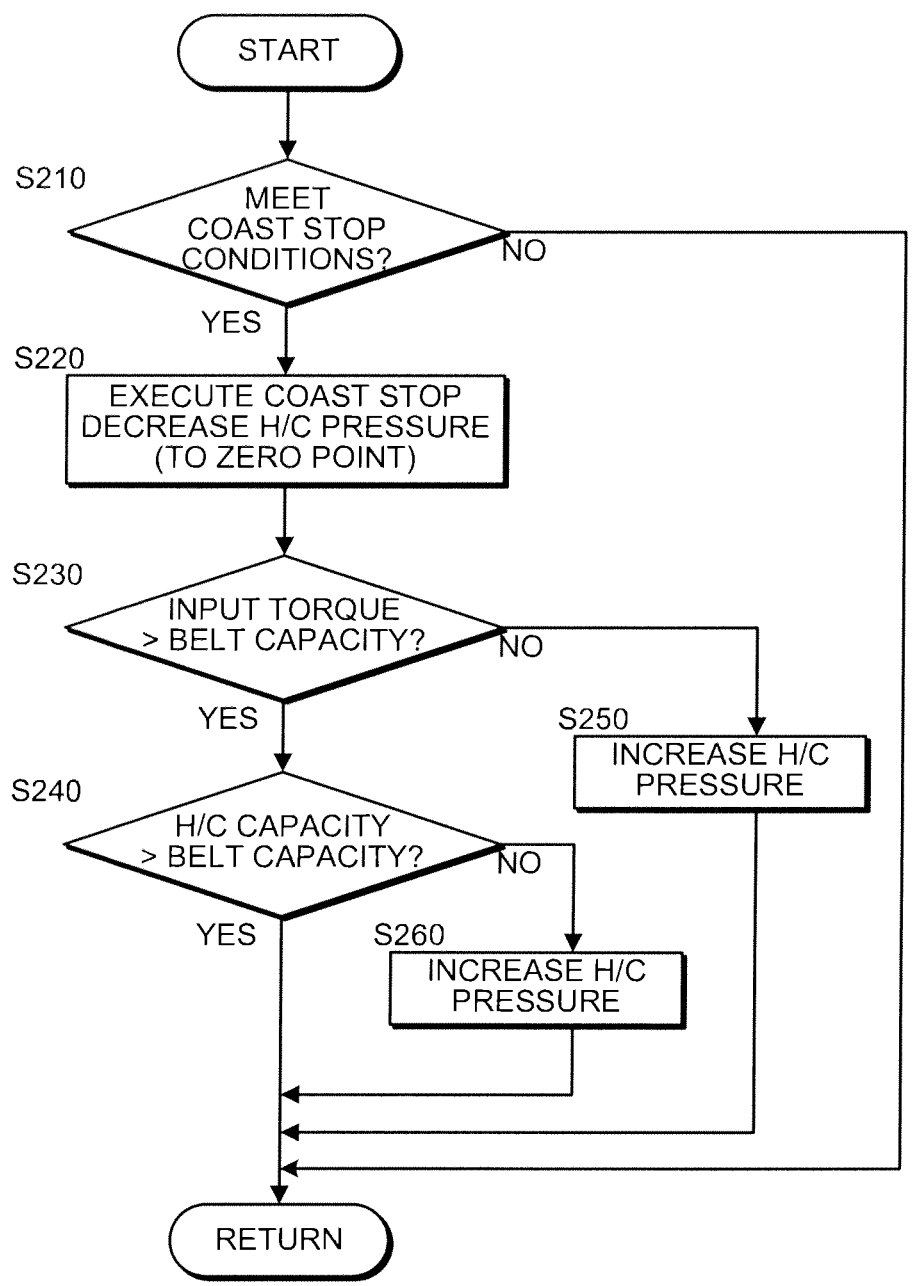
FIG. 7 is a flowchart of a coast stop control according to a second embodiment of the present invention.

FIG. 7 is a flowchart to execute a coast stop control by the controller 12 according to the second embodiment of the present invention. Like reference numbers refer to like elements shown in the first embodiment and explanation thereof will be omitted. A basic configuration of the second embodiment is similar to that of the first embodiment as shown in FIG. 1 and FIG. 2.

When the engine 1 starts (e.g. when the ignition is turned on), the controller 12 starts execution of the flowchart of FIG. 7 and execution is realized according to a predetermined period (e.g. 10 ms).

Firstly, the controller 12 determines whether or not the aforementioned coast stop conditions are met (S210). When the coast stop conditions are not met, the controller 12 returns to other processes without making a subsequent control.

When it is determined that the coast stop conditions are met, the process moves onto step S22 in which the controller 12 starts suspending the engine 1 by controlling the amount of fuel injection and a throttle valve or other factors of the engine 1. At this time, the lockup clutch of the torque converter 2 is released simultaneously so as to provide a converter state in which the engine 1 and the transmission 4 are separated from each other.

At this time, the controller 12 sets an H/C pressure to zero point simultaneously. Therefore, an H/C pressure decreases to result in a decrease of an H/C capacity.

Next, the process moves onto step S230, wherein the controller 12 determines if the magnitude of torque inputted to the transmission 4 is detected as exceeding a belt capacity or whether or not the magnitude of the input torque is predicted as exceeding a belt capacity.

The magnitude of input torque is detected as exceeding a belt capacity by determination using the brake sensor 47 and/or an acceleration sensor or map information and GPS positioning information of a car navigation system, similar to the step S130 according to the aforementioned first embodiment as shown in FIG. 5.

When input torque is detected or predicted as exceeding a belt capacity, the process moves onto step S240. Otherwise, the process moves onto step S250.

In no detection or prediction of input torque in excess of a belt capacity, the process moves onto step S250 in which the controller 12 resets an H/C pressure from zero point. That is, in no detection or prediction of input torque, an H/C capacity is increased to prevent reduction of a fastening force of the friction engagement elements in the auxiliary transmission mechanism 30. After processing the step S250, the controller 12 returns to other processes.

In response to detection or prediction of input torque in excess of a belt capacity, the controller 12 determines in the step S240 whether or not a capacity of the friction engagement elements in the auxiliary transmission mechanism 30 (i.e. H/C capacity here) exceeds a belt capacity.

In the step S240, when it is determined that an actual pressure of an H/C capacity still exceeds an actual pressure of a belt capacity in spite of a command to cause the hydraulic control circuit 11 to set zero point by the controller 12 in the aforementioned step S220, the command to set an H/C capacity to zero point is continued and an actual pressure of the H/C capacity moves toward zero point. Thereafter, processing by the present flowchart is finished and the controller 12 returns to other processes.

When an H/C capacity does not exceed a belt capacity, there is provided a state in which torque is inputted and a belt capacity exceeds an H/C capacity to allow slippage of the high clutch 33 before slippage of the belt 23. In this case, the process moves onto step S260 in which an H/C capacity is increased to exceed zero point so that reduction of a fastening force of the friction engagement elements in the auxiliary transmission mechanism 30 is prevented. After processing the step S260, the controller 12 returns to other processes.

By making such a control, when it is brought into a coast stop state, a capacity of the friction engagement elements in the auxiliary transmission mechanism (e.g. H/C capacity) is decreased immediately and an H/C capacity is controlled to fall under a belt capacity. Therefore, the high clutch 33 is made to slip earlier than the belt 23 in response to input torque, and the belt 23 is prevented from slipping.

In contrast, when input torque is small, it is determined that a belt capacity exceeds an H/C capacity and the high clutch 33 has a surplus H/C capacity, followed by raising an H/C pressure so as to increase an H/C capacity to exceed zero point in the step S250 or the step S260, whereby bringing the high clutch 33 into a fastened state. Therefore, while maintaining a fastening force of the friction engagement elements, a fastening shock occurring at restart due to reduction of a fastening force of the friction engagement elements and a start lag due to transmission of the friction engagement elements at restart can be suppressed.

Figure 8:
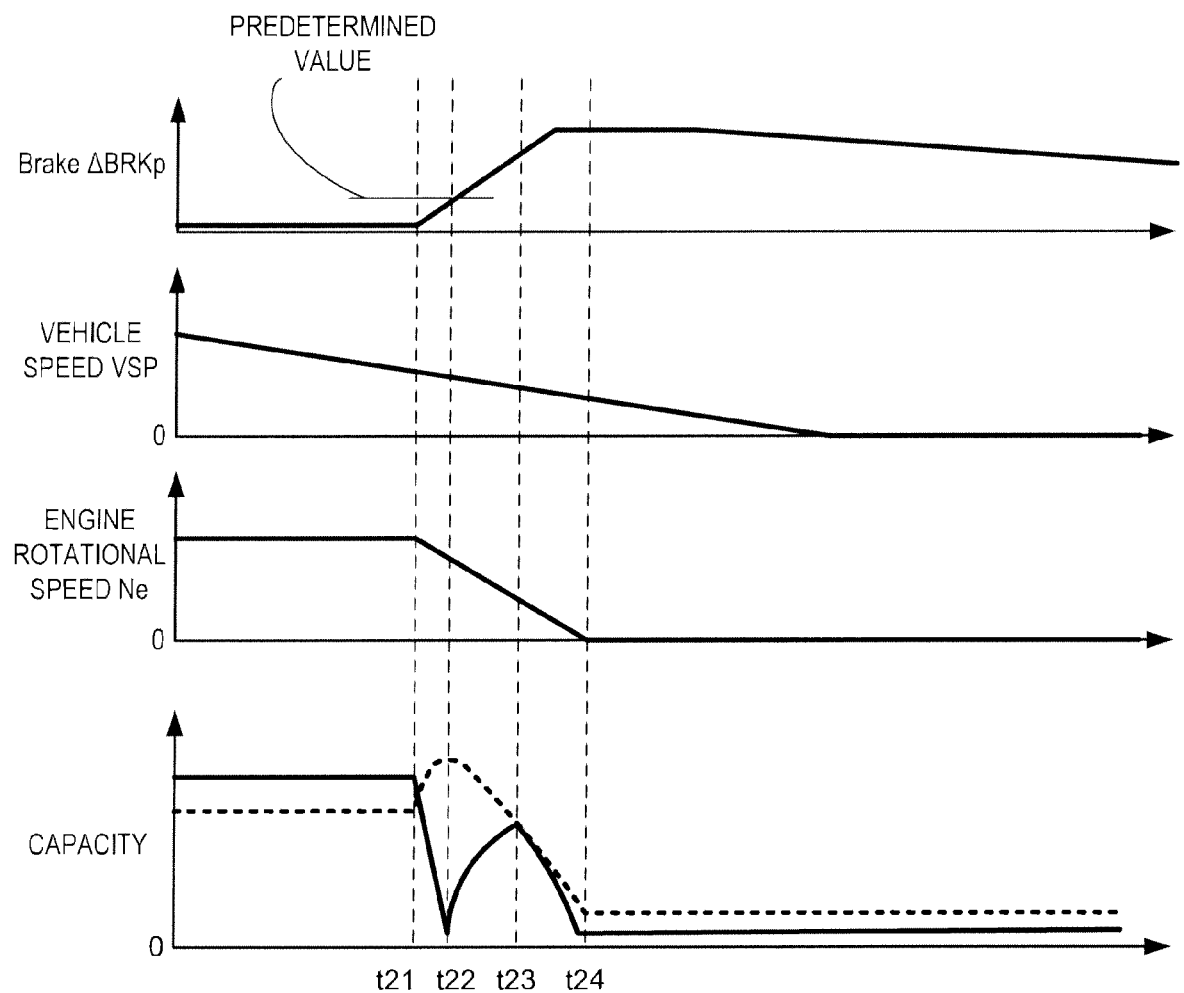
FIG. 8 is an explanatory diagram of the coast stop control according to the second embodiment of the present invention.

FIG. 8 is an explanatory diagram of the coast stop control according to the second embodiment of the present invention.

FIG. 8 shows, from the top, the brake pedal stepping rate ΔBRKp, the vehicle speed VSP, the engine rotational speed Ne and the relationship between a belt capacity and an H/C capacity.

In the graph showing the relationship between a belt capacity, an H/C capacity, and input torque, a solid line refers to an H/C capacity of the high clutch 33 and a broken line refers to a belt capacity of the belt 23.

In FIG. 8, the coast stop conditions are met at timing t21 (YES in step S210 shown in FIG. 7) and execution of a cost stop starts (in step S220 shown in FIG. 7). Therefore, the engine rotational speed Ne decreases gradually and stops eventually (at timings t21 to t24).

At the timing t21, an H/C capacity is initially set to zero point by processing the step S220 shown in FIG. 7. That is, an H/C capacity is decreased in preparation for input torque according to the coast stop control.

Thereafter, determination in the step S230 shown in FIG. 7 is made at timing t22 and when input torque is determined as exceeding a belt capacity from a value detected by the brake sensor 47 or other values, determination is made in the step S240 shown in FIG. 7. Here, if an H/C capacity is determined as falling under a belt capacity, the process moves onto the step S260 shown in FIG. 7, wherein an H/C pressure is controlled so that an H/C capacity increases. At this time, the engine rotational speed Ne is not brought into suspension yet and the mechanical oil pump 10m is driven to allow supply of an oil pressure, wherein the hydraulic control circuit 11 can be instructed to increase an H/C capacity.

Thereafter, at timing t23, determination is made in the step S240 shown in FIG. 7. Here, if an H/C capacity is determined as exceeding a belt capacity, the process returns to the step S220 shown in FIG. 7 in the next loop and an H/C capacity is set to zero point. By such a control, an H/C capacity decreases gradually. In a period from the timing t23 to the timing t24, the aforementioned steps S240 and S260 shown in FIG. 7 are processed and an H/C capacity is controlled in a range without exceeding a belt capacity (or an H/C capacity is preferably controlled to slightly fall under a belt capacity).

Thus, according to the second embodiment, an H/C capacity is decreased gradually by setting an H/C capacity to zero point under a coast stop control but if input torque does not exceed a belt capacity, an H/C capacity is controlled to become larger than input torque in a range without exceeding a belt capacity. By making such a control, while maintaining a fastening force of the friction engagement elements as much as possible, it is possible to suppress, for example, a fastening shock occurring at restart due to reduction of a fastening force of the friction engagement elements and a start lag due to transmission of the friction engagement elements at restart.

When input torque exceeds a belt capacity, an H/C capacity is increased in a range in which a belt capacity exceeds the H/C capacity and a fastening force of the high clutch 33 is increased, whereby a fastening force of the friction engagement elements can be similarly maintained as much as possible.

Next, a third embodiment of the present invention will be explained.

Figure 9:
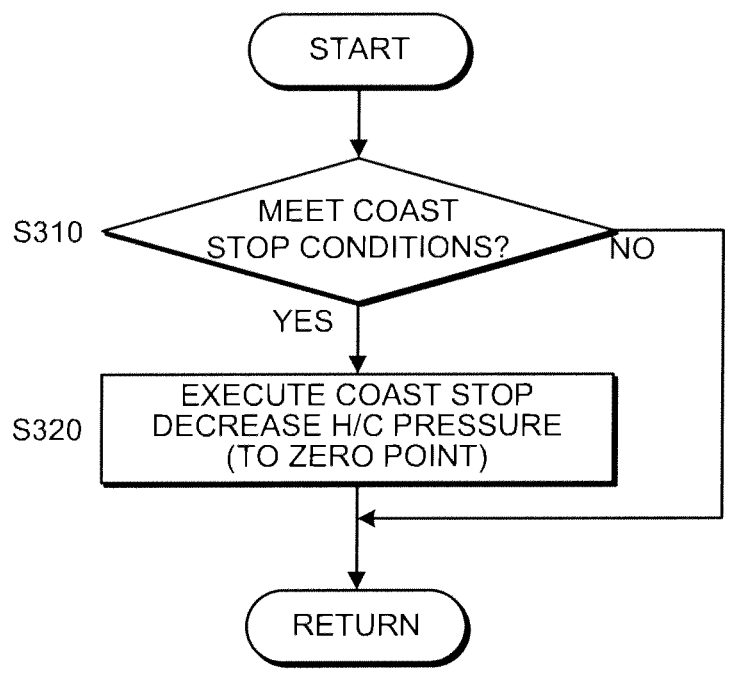
FIG. 9 is a flowchart of a coast stop control according to a third embodiment of the present invention.

FIG. 9 is a flowchart to execute a coast stop control by the controller 12 according to the third embodiment of the present invention. Like reference numbers refer to like elements shown in the first embodiment and explanation thereof will be omitted. A basic configuration of the third embodiment is similar to that of the first embodiment as shown in FIG. 1 and FIG. 2.

When the engine 1 starts (e.g. when the ignition is turned on), the controller 12 starts execution of the flowchart shown in FIG. 9 and execution is realized according to a predetermined period (e.g. 10 ms).

Firstly, the controller 12 determines whether or not the aforementioned coast stop conditions are met (S310). When the coast stop conditions are not met, the controller 12 returns to other processes without making a subsequent control.

When it is determined that the coast stop conditions are met, the process moves onto step S320 in which the controller 12 starts suspending the engine 1 by controlling the amount of fuel injection and a throttle valve or other factors of the engine 1. At this time, the lockup clutch of the torque converter 2 is released simultaneously so as to provide a converter state in which the engine 1 and the transmission 4 are separated from each other.

At this time, the controller 12 sets an H/C pressure to zero point simultaneously. Therefore, an H/C pressure decreases and an H/C capacity decreases to zero point. Thereafter, the controller 12 maintains an H/C capacity at zero point.

Figure 10:
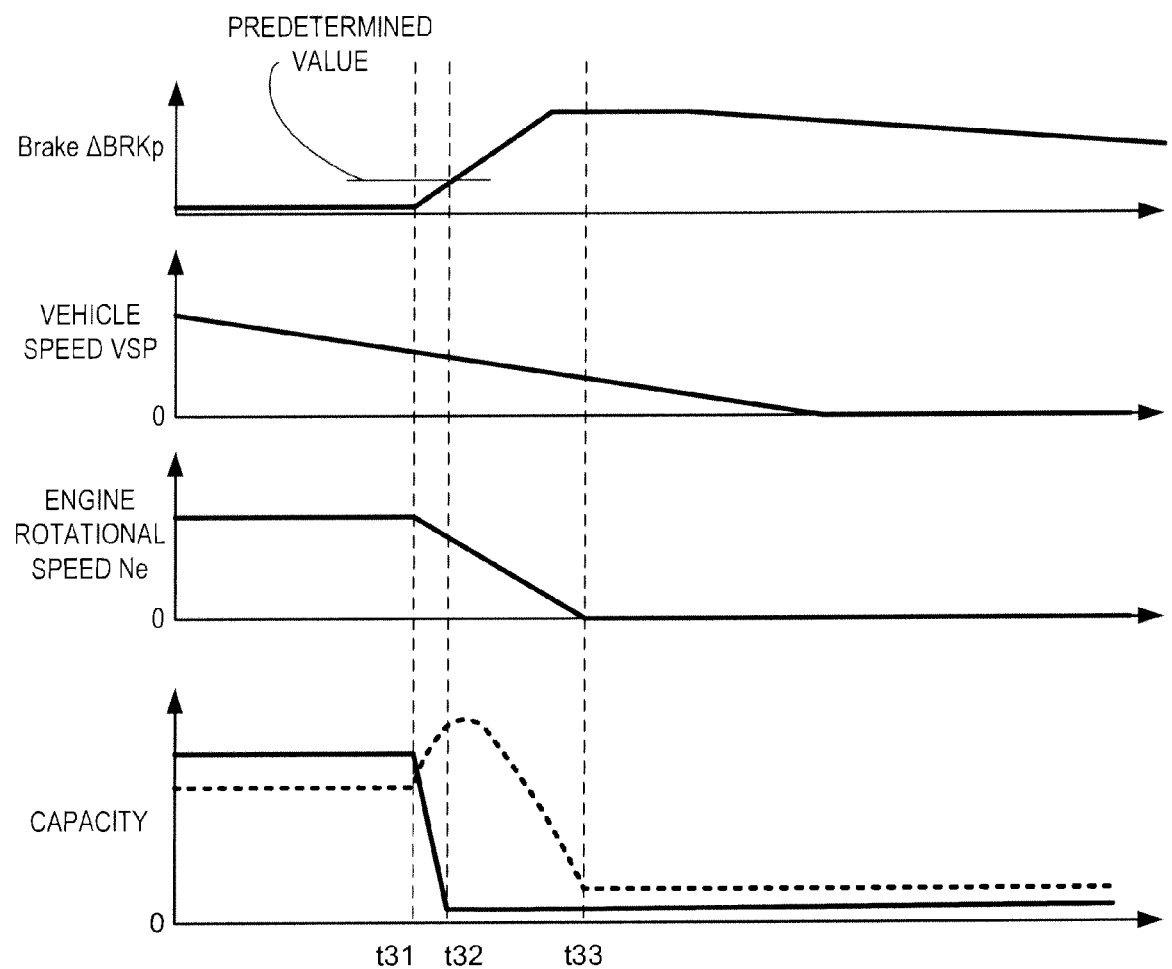
FIG. 10 is an explanatory diagram of the coast stop control according to the third embodiment of the present invention.

FIG. 10 is an explanatory diagram of the coast stop control according to the third embodiment of the present invention.

FIG. 10 shows, from the top, the brake pedal stepping rate ΔBRKp, the vehicle speed VSP, the engine rotational speed Ne and the relationship between a belt capacity and an H/C capacity.

In the graph showing the relationship between a belt capacity, an H/C capacity and input torque, a solid line refers to an H/C capacity of the high clutch 33 and a broken line refers to a belt capacity of the belt 23.

In FIG. 10, the coast stop conditions are met at timing t31 (YES in step S310 shown in FIG. 10) and execution of a coast stop starts (step S330 shown in FIG. 10).

At timing t31, an H/C capacity is set to zero point by processing the step S330 shown in FIG. 9. That is, when a coast stop control starts, an H/C capacity is decreased to zero point in preparation for input torque. Thereafter, an H/C capacity is maintained at zero point.

Thus, according to the third embodiment of the present invention, an H/C capacity is set to zero point at the start of a coast stop and this state is maintained. By such a control, the clutch 33 is made to slip earlier in response to input torque and the belt 23 is prevented from slipping.

Furthermore, when a solenoid for controlling a fastening force of the high clutch 33 which decreases a capacity is configured to be low normally for example, a current consumed by the solenoid can be reduced by maintaining the high clutch 33 at zero point.

Controlling an H/C capacity at zero point by the controller 12 is finished when, for example, the vehicle speed VSP becomes zero and the vehicle comes to a halt or when the engine 1 is made to restart by detecting intension of acceleration by a driver resulting from stepping on an accelerator pedal. It is because the high clutch 33 needs to be fastened for restart in such circumstances and in order to increase an H/C capacity promptly for suppressing, for example, a fastening shock at restart due to reduction of a fastening force of the friction engagement elements and a start lag due to transmission of the friction engagement elements at restart.

Although the embodiments of the present invention are as explained above, each of the above embodiments shows merely one of application examples of the present invention and is not provided for the purpose of limiting the technical scope of the present invention to the concrete configurations of the above embodiments.

For example, even though the variator 20 is provided as a v-belt continuously variable transmission mechanism in the above embodiments, the variator 20 may also be a continuously variable transmission mechanism with a chain wound around the pulleys 21 and 22 in place of the belt 23. Alternatively, the variator 20 may also be a toroidal-type continuously variable transmission mechanism in which a tiltable power roller is arranged between an input disk and an output disk.

Although the auxiliary transmission mechanism 30 is a transmission mechanism having two forward shift stages including the first speed and the second speed in the above embodiments, the auxiliary transmission mechanism 30 may also be a transmission mechanism having three or more forward shift stages.

Although the auxiliary transmission mechanism 30 is configured by using a Ravigneaux-type planetary gear mechanism, there is no limitation to such a configuration. For example, the auxiliary transmission mechanism 30 may be configured by combining a common planetary gear mechanism and a friction engagement element or may also be configured by a plurality of power transmission paths composed of a plurality of gear trains with different speed ratios and a friction engagement element for switching these power transmission paths.

The auxiliary transmission mechanism 30 may be disposed in either a front stage or a rear stage relative to the variator 20. For example, when the auxiliary transmission mechanism 30 is disposed in a rear stage to the engine 1 and in a front stage to the variator 20, it is particularly effective to cope with shock torque received from the engine 1. In contrast, when the auxiliary transmission mechanism 30 is disposed in a rear stage to the variator 20, it is particularly effective to cope with shock torque received from the driving wheels 7. Furthermore, in place of the auxiliary transmission mechanism 30 having a shift stage, a forward/rearward switch mechanism may also be used.

This invention is not limited to the embodiment described above, and naturally includes various modifications and improvements within the scope of the technical spirit thereof.

This application claims priority from Japanese Patent Application No. 2012-75023 filed Mar. 28, 2012, which is incorporated herein by reference.

What we claimd is:

1. A control device for a continuously variable transmission, being mounted on a vehicle and provided with a continuously variable transmission mechanism for changing a speed ratio by changing a winding diameter of a belt held by an oil pressure supplied to pulleys, and at least one friction engagement element connected to the continuously variable transmission mechanism in order to allow transmission of a driving force of a driving power source continuously, comprising:
  a control unit adapted to decrease, during a coast stop control to stop the driving power source in a traveling state of the vehicle, a transmission torque capacity that is torque transmittable by the at least one friction engagement element to fall under a belt capacity that is torque transmittable by the belt using a holding force of the pulleys by setting an indicated pressure applied to the at least on friction engagement element to a zero point.

2. The control device for a continuously variable transmission according to claim 1, wherein
  the control unit is adapted to decrease, upon detection or prediction of torque inputted to the continuously variable transmission mechanism, the transmission torque capacity to fall under the belt capacity.

3. The control device for a continuously variable transmission according to claim 1, wherein
  the control unit is adapted to make the transmission torque capacity smaller than the belt capacity by rendering a gap between an input element and an output element of the at least one friction engagement element zero as well as by rendering the transmission torque capacity zero.

4. The control device for a continuously variable transmission according to claim 1, wherein
  the control unit is adapted not to decrease the transmission torque capacity when there is no detection or prediction of torque inputted to the continuously variable transmission mechanism.

5. The control device for a continuously variable transmission according to claim 1, wherein
  the control unit is adapted not to decrease the transmission torque capacity in response to the transmission torque capacity being less than the belt capacity.

6. The control device for a continuously variable transmission according to claim 1, wherein
  the control unit is adapted to decrease, in decreasing the transmission torque capacity to fall under the belt capacity, the transmission torque capacity to bring the at least one friction engagement element to be unable to transmit torque.

7. The control device for a continuously variable transmission according to claim 6, wherein
  the control unit is adapted to increase the transmission torque capacity to exceed torque inputted to the continuously variable transmission mechanism after decreasing a fastening force of the at least one friction engagement element so as to bring the at least one friction engagement element to be unable to transmit torque.

8. The control device for a continuously variable transmission according to claim 7, wherein
  the control unit is adapted to make the transmission torque capacity smaller than the belt capacity in response to torque inputted to the continuously variable transmission mechanism in excess of the belt capacity.

9. A control method for a continuously variable transmission, for changing a speed ratio by changing a winding diameter of a belt held by an oil pressure supplied to pulleys, and at least one friction engagement element connected to the continuously variable transmission mechanism in order to allow transmission of a driving force of a driving power source continuously, comprising:
  decreasing, during a coast stop control to stop the drive power source in a traveling state of the vehicle, a transmission torque capacity that is torque transmittable by the at least one friction engagement element to fall under a belt capacity that is torque transmittable by the belt using a holding force of the pulleys by setting an indicated pressure applied to the at least one friction engagement element to a zero point.

10. A control device for a continuously variable transmission, being mounted on a vehicle and provided with a continuously variable transmission mechanism for changing a speed ratio by changing a winding diameter of a belt held by an oil pressure supplied to pulleys, and at least one friction engagement element connected to the continuously variable transmission mechanism in order to allow transmission of a driving force of a driving power source continuously, comprising:
  means for decreasing a transmission torque capacity, during a coast stop control to stop the drive power source in a traveling state of the vehicle, the transmission torque capacity being torque transmittable by the at least one friction engagement element to fall under a belt capacity that is torque transmittable by the belt using a holding force of the pulleys by setting an indicated pressure applied to the at least one friction engagement element to a zero point.

\* \* \* \* \*